F. A. BROWN.
VULCANIZING PAD.
APPLICATION FILED SEPT. 14, 1920.
1,379,391.
Patented May 24, 1921.
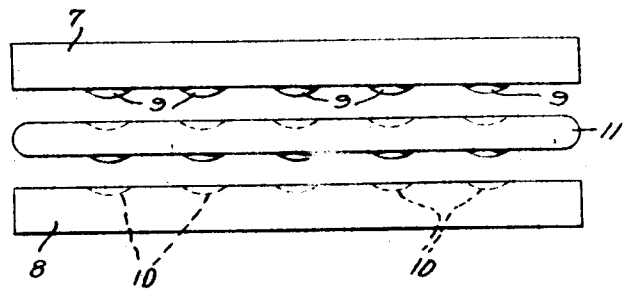
Inventor,
Frank A. Brown,
By his Attorney,
Ernest Hopkinson

UNITED STATES PATENT OFFICE.

FRANK A. BROWN, OF INDIANAPOLIS, INDIANA, ASSIGNOR TO G. & J. TIRE COMPANY, A CORPORATION OF INDIANA.

VULCANIZING-PAD.

1,379,391.     Specification of Letters Patent.     Patented May 24, 1921.

Application filed September 14, 1920. Serial No. 410,221.

*To all whom it may concern:*

Be it known that I, FRANK A. BROWN, a citizen of the United States, residing at Indianapolis, county of Marion, State of Indiana, have invented new and useful Improvements in Vulcanizing-Pads, of which the following is a full, clear, and exact description.

The present invention relates to an improved pad for interposition between the platens of a suitable press to double the capacity of the same for curing and shaping articles of rubberized fabric such as blow-out patches and interliners.

Pads previously in use for this purpose have been made of a thick body of slow curing gum sheathed with fabric initially formed complementary to the heated press platens which have interfitting projections and recesses by clamping therebetween. Thus constructed, the pads were unsatisfactory, the gum did not flow evenly when initially pressed and heated, and weak areas were formed which deteriorated rapidly.

The present invention aims to provide a more durable pad and one that will maintain its shape longer in service.

Briefly, the invention consists of a pad constructed of masses or sheets of non-curing plastic, such as rubber or rubber composition with interposed layers of fibrous material such as felt.

The invention is illustrated in the accompanying drawings, in which:

Figure 1 is a longitudinal cross-section through a pad constructed according to the present invention; and Fig. 2 illustrates the pad in working position between press platens with which it is designed to coöperate.

As illustrated in the drawings the pad is made by interposing masses or sheets 1 and 2 of fibrous material, preferably hair felt, between a central layer 3 and outer layers 4 and 5 of non-vulcanizable plastic material, such as gum rubber or rubber composition, the composition pad is then preferably covered with a heavy fabric 6, such as canvas, affording a good wearing and not easily disrupted surface.

When clamped between hydraulically operable platens 7 and 8, which are adapted to be heated in any suitable manner as by internally circulating steam, the pads may be shaped complementary to the opposed projections 9 and recesses 10 of the platens. These projections and recesses 10 are shaped to impart the desired form to the articles to be subsequently cured between it and the press platens. In the case of blow-out patches the projections 9 and 10 are respectively convex and concave and substantially spherical. While in the manufacture of interliners the projections and recesses are also convex and concave, they are not truly spherical, but elongated crosswise of the platens, roughly speaking being ovoidal in shape.

When the pads are initially clamped between heated platens of the above described shape the non-vulcanizable mass of gummed rubber softens and intermingles with the fibers of wool or hair that form the layer of felt and bind the same together so as to form a unitary structure. The pads 11 thus formed will not lose their shape and deteriorate as rapidly as the pads made entirely of slow curing gum without felt and will not get sticky on their exterior so as to adhere to the pads or interliners that are pressed thereagainst during the shaping and curing operation.

For a fuller understanding of the use of the pad reference may be had to my copending application filed of even date with this application, Serial No. 410,222.

Having thus described my invention what I claim as new and desire to protect by Letters Patent is:

1. A pad for shaping articles of fabric coated with vulcanizable composition consisting of layers of fibrous material and non-vulcanizable adhesive binding intermingled and united together and a non-adhesive covering.

2. A pad for shaping articles of fabric coated with vulcanizable composition consisting of layers of non-vulcanizable gum binding and intermediate layers of felt reinforcing and uniting the felt layers and a non-adhesive covering.

3. A pad for shaping articles of fabric coated with vulcanizable composition consisting of outer and central layers of non-curable rubber and layers of felt intermediate the rubber, the former binding the latter together and forming therewith a unitary article and a non-adhesive covering.

Signed at Indianapolis, Ind., this 7th day of September, 1920.

FRANK A. BROWN.